Patented Nov. 10, 1925.

1,561,332

UNITED STATES PATENT OFFICE.

THOMAS E. LAW, OF MESA, ARIZONA.

PUNCTURE-CLOSING COMPOSITION.

No Drawing. Application filed February 24, 1925. Serial No. 11,383.

*To all whom it may concern:*

Be it known that I, THOMAS E. LAW, a citizen of the United States, and a resident of Mesa, in the county of Maricopa and State of Arizona, have discovered and invented a certain new and useful Puncture-Closing Composition, of which the following is a specification.

My invention relates to compositions for closing the punctures or blow-outs in tires for automobiles or other vehicles using inflatable tires, and the object is to provide a simple compound of readily obtainable materials which will form a very efficient puncture closing or tire patching mixture and which will act quickly and automatically so that the puncture or blow-out will be closed without the attention of the driver or operator, and which is inexpensive and easily manufactured, and readily applied.

The new compound is preferably prepared according to the following formula: asbestos, slippery elm bark and water.

In the preparation of the compound the ingredients are treated as follows: The asbestos is ground and the slippery elm bark is pulverized, and the proportions of the several elements of the mixture are about as follows. To one pound of ground asbestos add one ounce of pulverized slippery elm bark, with three pints of water. They are then mixed thoroughly and injected into the inner tube or pneumatic casing or tire.

The asbestos is used more especially for ensuring that the puncture in the tire may be closed as this asbestos being fibrous, when under pressure forms a network which arrests and holds the particles of the pulverized slippery elm bark, and this compound being forced into the punctures or blow-out forms a positive dependable closure that will effectually prevent escape of air from the tire.

The compound is introduced into the tire in any desired manner, and the desired quantity so that there will always be sufficient to take care of several punctures, etc.

What I claim is:

1. A puncture closing composition for pneumatic tires consisting of ground asbestos, pulverized slippery elm bark, and water in such proportions as to permit introduction into the tire.

2. A puncture closing composition for pneumatic tires consisting of one pound of pulverized asbestos, one ounce of pulverized slippery elm bark, and three pints of water.

THOMAS E. LAW.